United States Patent
Nicholson et al.

(10) Patent No.: US 9,166,362 B2
(45) Date of Patent: Oct. 20, 2015

(54) CASCADED RAMAN LASING SYSTEM

(71) Applicant: OFS Fitel, LLC, Norcross, GA (US)

(72) Inventors: Jeffrey W Nicholson, Warren, NJ (US); Supradeepa V. S. Ramakrishna, Piscataway, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/352,391

(22) PCT Filed: Oct. 19, 2012

(86) PCT No.: PCT/US2012/061145
§ 371 (c)(1),
(2) Date: Apr. 17, 2014

(87) PCT Pub. No.: WO2013/059681
PCT Pub. Date: Apr. 25, 2013

(65) Prior Publication Data
US 2014/0254614 A1  Sep. 11, 2014

Related U.S. Application Data

(60) Provisional application No. 61/548,969, filed on Oct. 19, 2011.

(51) Int. Cl.
| | | |
|---|---|---|
| *H01S 3/30* | (2006.01) |
| *H01S 3/067* | (2006.01) |
| H01S 3/094 | (2006.01) |
| H01S 3/10 | (2006.01) |
| H01S 3/16 | (2006.01) |
| H01S 3/00 | (2006.01) |

(52) U.S. Cl.
CPC ............... *H01S 3/302* (2013.01); *H01S 3/0078* (2013.01); *H01S 3/0675* (2013.01); *H01S 3/06716* (2013.01); *H01S 3/06754* (2013.01); *H01S 3/094042* (2013.01); *H01S 3/10092* (2013.01); *H01S 3/1618* (2013.01)

(58) Field of Classification Search
CPC ........... H01S 3/30; H01S 3/302; H01S 3/067; H01S 3/06754; H01S 3/2316
See application file for complete search history.

(56) References Cited

U.S. PATENT DOCUMENTS

| | | | | |
|---|---|---|---|---|
| 6,212,310 B1 * | 4/2001 | Waarts et al. | ................... | 385/24 |
| 6,407,855 B1 * | 6/2002 | MacCormack et al. | ....... | 359/346 |
| 2002/0015220 A1 * | 2/2002 | Papernyl et al. | ............... | 359/334 |
| 2003/0021302 A1 * | 1/2003 | Grudinin et al. | .................. | 372/6 |
| 2005/0111509 A1 * | 5/2005 | Brasseur et al. | ................ | 372/55 |

* cited by examiner

*Primary Examiner* — Eric Bolda
(74) *Attorney, Agent, or Firm* — Jacobs & Kim LLP

(57) ABSTRACT

In a Raman system, a primary laser source emits laser light at an initial wavelength, and a seed source emits a multi-wavelength seed laser light. The seed wavelengths correspond to a respective Stokes orders of the primary laser light. The primary laser light and the seed laser light are combined and fed into a Raman gain medium. Stimulated Raman scattering (SRS) causes the primary laser light to be converted into laser light at a selected target wavelength. The seeding of the primary light mediates the conversion process, so as to reduce spontaneous Raman scattering.

13 Claims, 12 Drawing Sheets

20

| Stokes Order | Wavelength | Classification | |
|---|---|---|---|
| - | 1117nm | Initial Wavelength (Primary Laser Input) | - |
| 1st Stokes Order | 1175nm | Intermediate Stokes Orders | Seed Wavelengths (corresponding to all of 1st-5th Stokes orders or selected subset) |
| 2nd Stokes Order | 1240nm | | |
| 3rd Stokes Order | 1310nm | | |
| 4th Stokes Order | 1390nm | | |
| 5th Stokes Order | 1480nm | Final Stokes Order (Target Wavelength, System Output) | |
| 6th Stokes Order | 1590nm | Post-Target Stokes Order (prevented by Raman filter fiber) | - |

FIG. 2

CASCADED RAMAN LASING SYSTEM

CROSS REFERENCE TO RELATED APPLICATIONS

The present application claims the priority benefit of U.S. Prov. Patent App. Ser. No. 61/548,969, filed on Oct. 19, 2011, which is owned by the assignee of the present application, and which is incorporated by reference herein in its entirety.

BACKGROUND OF THE INVENTION

1. Field of the Invention

The present invention relates generally to optical fiber devices and methods, and in particular to an improved cascaded Raman lasing system.

2. Background Art

Raman lasing systems are useful devices for converting laser light at a first wavelength into laser light at a second, longer wavelength. One important use for Raman lasers is to provide wavelength conversion for rare-earth fiber lasers. A typical ytterbium (Yb) fiber laser, for example, may emit light at 1117 nm. Infrared optical communications, however, commonly operate in the C-band, i.e., 1530 nm-1565 nm, which corresponds to the amplification range of an erbium-doped fiber amplifier (EDFA). Thus, a Raman laser can be used to convert a Yb-laser emission having a wavelength of 1117 nm into a high-brightness laser light having a wavelength of 1480 nm that can be used to pump an EDFA operating in the C-band.

For a number of reasons, Raman lasing technology has not yet reached its full potential in the industry. One significant issue that must be addressed is efficiency. Even the most sophisticated Raman lasers in the prior art have been unable to achieve a conversion ratio of greater than 50%.

Such lasers are fabricated, such as n conjunction One use for a Raman laser generating laser outputs at wavelengths at which rare-earth ionic gain is not available, e.g., near-infrared (NIR) wavelengths. A Raman laser provides a stepwise transition from a starting wavelength to a selected target wavelength. The stepwise transition is created through cascaded lasing of one or more Raman orders in a suitable Raman gain medium.

One way to bring about cascaded lasing in a Raman gain medium is to provide a set of input gratings at a first end of the Raman gain medium and a corresponding set of output gratings at a second end of the Raman gain medium. Individual input gratings are wavelength-matched to individual output gratings so as to create a nested series of in-line grating pairs. The grating pairs define a nested series of Raman cavities in the Raman gain medium.

SUMMARY OF THE INVENTION

These and other issues are addressed by the present invention, aspects of which are directed to a cascaded Raman lasing system and associated structures and techniques, in which conversion efficiency is significantly increased compared with prior-art architectures.

In an exemplary system, a power source emits a primary laser light at an initial wavelength, and a seed source emits seed laser light at a plurality of seed wavelengths, each of which corresponds to a respective Stokes orders of the primary laser light. The primary laser light and the seed laser light are combined and fed into a Raman gain medium. Stimulated Raman scattering (SRS) causes the primary laser light to be converted into laser light at a selected target wavelength, which is provided as a system output. SRS occurs in a cascaded series of stages, each stage corresponding to a respective Stokes order of the primary laser light. The system output wavelength, i.e., the target wavelength, corresponds to the final Stokes order in the cascaded series. The function of the seed input is to allow SRS to take place with little or no spontaneous Raman scattering, thereby significantly increasing conversion efficiency.

According to a further aspect of the invention, the seed source comprises an auxiliary cascaded Raman laser that generates laser light at a series of Stokes orders that provide the respective seed wavelength components of the seed laser light. Additional aspects of the invention are directed to a number of different implementations and system topologies.

BRIEF DESCRIPTION OF THE DRAWINGS

FIG. 2 shows a table illustrating the correspondence between an exemplary set of Stokes orders and seed wavelengths in accordance with an aspect of the invention.

DETAILED DESCRIPTION

Figure 1A:
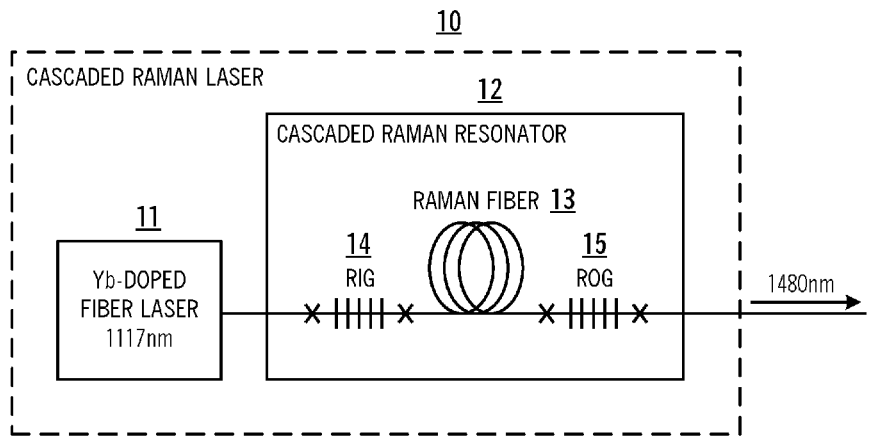
FIGS. 1A and 1B show, respectively, a diagram of a cascaded Raman amplifier according to the prior art, and a diagram of the cascaded Raman resonator using the FIG. 1 Raman amplifier.

Aspects of the present invention are directed to a "multi-wavelength mediated cascaded Raman amplifier" and associated structures and techniques. As described below and in the accompanying drawings, the invention increases the conversion efficiency of a Raman lasing system by feeding into a Raman gain medium a combined light input, including primary laser light from a power source and multi-wavelength seed laser light from a seed source. As discussed below, individual seed wavelengths correspond to respective Stokes orders of the primary laser light, and are configured to result in cascaded stimulated Raman scattering of the primary laser light within the gain medium, with little or no spontaneous Raman scattering. As further discussed below, the described architecture results in a significant increase in conversion efficiency.

As used herein, the term "Raman system" refers generically to Raman amplifiers, Raman lasers, and any other optical device or system in which a resonant medium is used to transfer optical power from light at an input wavelength to light at a longer target wavelength by means of stimulated Raman scattering at one or more Stokes orders of the input light.

The term "Raman gain medium" refers generically to Raman fibers, Raman filter fibers, and any other medium that is suitable for use in a Raman system.

The term "Raman fiber" refers generically to an optical fiber providing efficient Raman gain. Typically, a Raman fiber has a relatively high-index core, and a relatively small effective area.

The term "Raman filter fiber" refers generically to a Raman fiber that is configured to filter out wavelengths of light longer than a specified cutoff wavelength. A Raman filter fiber is described in U.S. patent application Ser. No. 12/777,465, which is owned by the assignee of the present application, and which is incorporated by reference herein in its entirety.

It is further noted that terms "Raman fiber" and "Raman filter fiber" include Raman fibers and Raman filter fibers that have been configured to provide additional desired features or combinations of features, such as loss reduction, maintenance of polarization, suppression of Brillouin scattering, or the like.

In the following description, aspects of the invention are presented in the context of converting laser light from an initial wavelength of 1117 nm to a target wavelength of 1480 nm. As mentioned above, the conversion of laser light from 1117 nm to 1480 nm is commonly used to allow a Yb fiber laser, having an output wavelength of 1117 nm, to provide pump light at 1480 nm for an erbium-doped fiber amplifier (EDFA) operating in the C-band. It will be appreciated that the present invention may be practiced in other contexts to provide other types of wavelength conversions.

The present discussion is divided into the following sections:
1. Conventional Cascaded Raman Laser Architecture
2. New Architecture
   2.1 Primary Laser Source
   2.2 Seed Source
   2.3 Combiner
   2.4 Raman Gain Medium
3. Experimental Confirmation
   3.1 Experimental Setup
   3.2 Results
4. Further Practices of the Invention
5. General Technique
1. Conventional Cascaded Raman Laser Architecture In order to provide context for the present discussion, there is first described a Raman architecture according to the prior art.

FIG. 1A shows a schematic diagram of a conventional cascaded Raman laser 10, comprising a continuous wave (CW) cladding-pumped Yb-doped high-power fiber laser 11 and a cascaded Raman resonator (CRR) 12.

The Yb-doped fiber laser 11 is pumped by 915 nm or 975 nm laser diodes (not shown), and emits light in the 1100 nm wavelength range, which is provided as an input into CRR 12. CRR 12, in turn, utilizes stimulated Raman scattering to convert the ~1100 nm input light into an output 13 at a selected target wavelength. This wavelength conversion occurs in a series of stages corresponding to the Stokes orders of the input light within CRR 12.

CRR 12 comprises a calculated length of a Raman-active, high-nonlinearity optical fiber 13. A nested series of Raman cavities are constructed in the fiber through the use of a set of Raman input gratings (RIG) 14 and a corresponding set of Raman output gratings (ROG) 15.

Figure 1B:
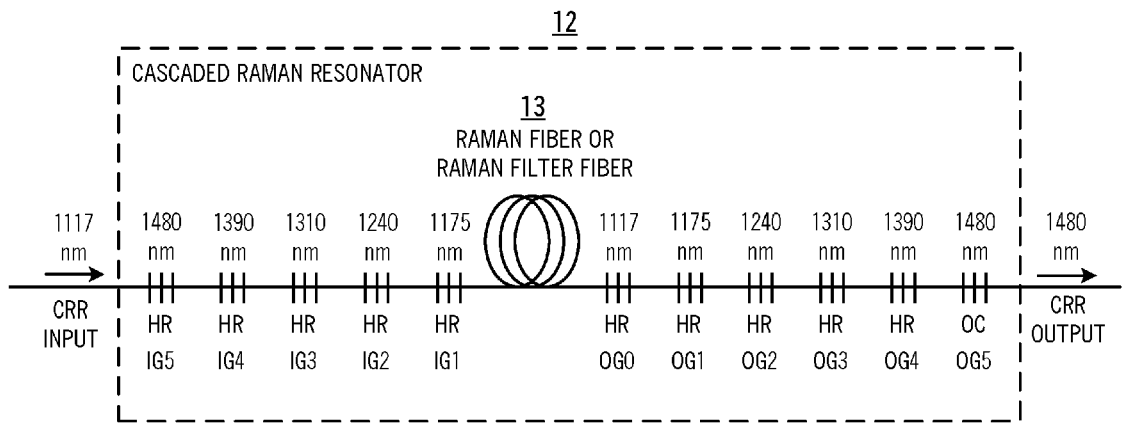

FIG. 1B shows a schematic diagram illustrating CRR 12 in greater detail. The set of Raman input gratings (RIG) comprises five gratings IG1-IG5. The set of Raman output gratings (ROG) comprises six gratings OG0-OG5. All of the input gratings and output gratings are high reflectors (HRs), except for output grating OG5, which is an output coupler (OC) having relatively low reflectivity.

Output grating OG0 has a wavelength of 1117 nm, i.e., the same wavelength as the input from the Yb-laser 11 (FIG. 1). Input gratings IG1-IG5 and output gratings OG1-OG5 form a set of five wavelength-matched pairs corresponding, respectively, to the first five Stokes orders of the CRR input.

Input gratings IG1-IG5 and output gratings OG1-OG5 are arranged in a nested configuration, with the first Stokes order grating pair IG1/OG1 (1175 nm) towards the center, and each successive grating pair following in an outward progression: IG2/OG2 (1240 nm); IG3/OG3 (1310 nm); IG4/OG4 (1390 nm); and IG5/OG5 (1480 nm). The 1480 nm wavelength of the final grating pair IG5/OG5 is equal to the final Stokes order, i.e., the target wavelength.

Together with Raman fiber 13 and input gratings IG1-IG5 and output gratings OG1-OG5 form a nested series of Raman cavities, each of which is separated in wavelength from the immediately preceding cavity by a respective Stokes shift. Each cavity corresponds to a stage in the cascaded conversion of light from the input wavelength to the target wavelength.

In operation, the 1117 nm input light causes spontaneous Raman scattering to occur at the first Stokes shift at 1240 nm. (Output grating OG0 prevents loss of unconverted input light.) The light at 1240 nm reaches an intensity allowing stimulated Raman scattering to occur. Light at 1117 nm is depleted as it is used to pump the light at 1240 nm. Light at 1240 nm causes spontaneous Raman scattering to occur at the second Stokes order at 1310 nm, until stimulated Raman scattering can occur at the second Stokes order. The process repeats itself through higher Stokes orders until the target wavelength is reached at the final Stokes order at 1480 nm. Grating OG5 is configured as an output coupler (OC) to allow amplified light at the 1480 nm target wavelength to exit RCC 12 as the system output.

In high-power applications, a Raman filter fiber (i.e., a fiber with a selected cutoff wavelength) may be used to frustrate SRS that may otherwise occur at wavelengths longer than the target wavelength. "Post-target" SRS can result in a significant depletion of the target wavelength light.

The output of CRR 12 primarily comprises light at the target wavelength, 1480 nm, which typically carries most of the output power (>90%). The remaining output power is distributed among the intermediate Stokes orders (i.e., the Stokes orders between the initial wavelength and the target wavelength).

The quantum limited efficiency for cascaded Raman conversion is the ratio of the output wavelength and the input wavelength. Thus, in the case of 1117 nm-to-1480 nm conversion, the quantum limited efficiency is approximately 75%. However, in practice, the highest efficiencies that has been achieved in 1117 nm-to-1480 nm Raman lasers have been less than 50%. Raman lasers operating over other wavelength ranges have demonstrated a similar lack of efficiency.

The primary sources responsible for a of efficiency include the following: transmission loss in the Raman input grating set and output grating set; splice loss resulting from intra-cavity splices between the (possibly dissimilar) low-effective-area fibers that are used to implement the grating sets and the Raman gain fiber; linear loss in the Raman fiber; and splice loss between the Yb-doped fiber laser output and the low-effective-area fiber of the Raman grating set.

2. New Architecture

Aspects of the invention are directed to a Raman lasing architecture that achieves a significant enhancement of the conversion efficiency compared with previous architectures. The most efficient 1117 nm-to-1480 nm Raman lasing architectures in the prior art have demonstrated conversion efficiencies <50%. A 1117 nm-to-1480 nm Raman lasing system, constructed in accordance with aspects of the invention described herein, demonstrated a conversion efficiency of ~65%. Thus, the present invention represents a significant improvement over prior art architectures, and takes Raman lasing technology a long way towards the quantum-limited efficiency of 75%.

According to an aspect of the invention, conversion efficiency in a Raman system is increased by combining the Raman input with a multi-wavelength "seed" light. The seed wavelengths correspond to respective Stokes orders of the primary laser light, and serve to mediate the conversion process, so as to reduce or eliminate spontaneous Raman scattering, thus ensuring that most or all of the power conversion arises as a result of stimulated Raman scattering.

FIG. 2 shows a table setting forth the illustrating the first six Stokes orders of a 1117 nm laser light propagating in an exemplary Raman gain medium, and the corresponding seed wavelengths. As shown in FIG. 2, the primary light has an initial wavelength of 1117 nm, and is converted to a target wavelength of 1480 nm in a series of stages corresponding to the first five Stokes orders: 1175 nm, 1240 nm, 1310 nm, 1390 nm, and 1480 nm. The first four Stokes orders are referred to herein as "intermediate" Stokes orders. The fifth Stokes order, at the target wavelength, is referred to herein as the "final" Stokes order. Stokes orders beyond the target wavelength (i.e., 1590 nm et seq.) are referred to herein as "excess" or "post-target" Stokes orders.

According to an aspect of the invention, the seed wavelengths that are fed into the Raman gain medium comprise a set of individual wavelengths, each of which is equal to, or substantially equal to, a respective intermediate Stokes order or to the final Stokes order. Generally speaking, a greater increase in efficiency can be achieved where there is a one-to-one correspondence between the set of seed wavelengths and the set of conversion Stokes orders. However, as discussed below, it is also possible to achieve at least some increase in efficiency in a Raman system employing a set of seed wavelengths in which one or more Stokes orders is omitted. In that case, each omitted Stokes order is generated through spontaneous Raman scattering, following by stimulated Raman scattering at that Stokes order.

Figure 3:
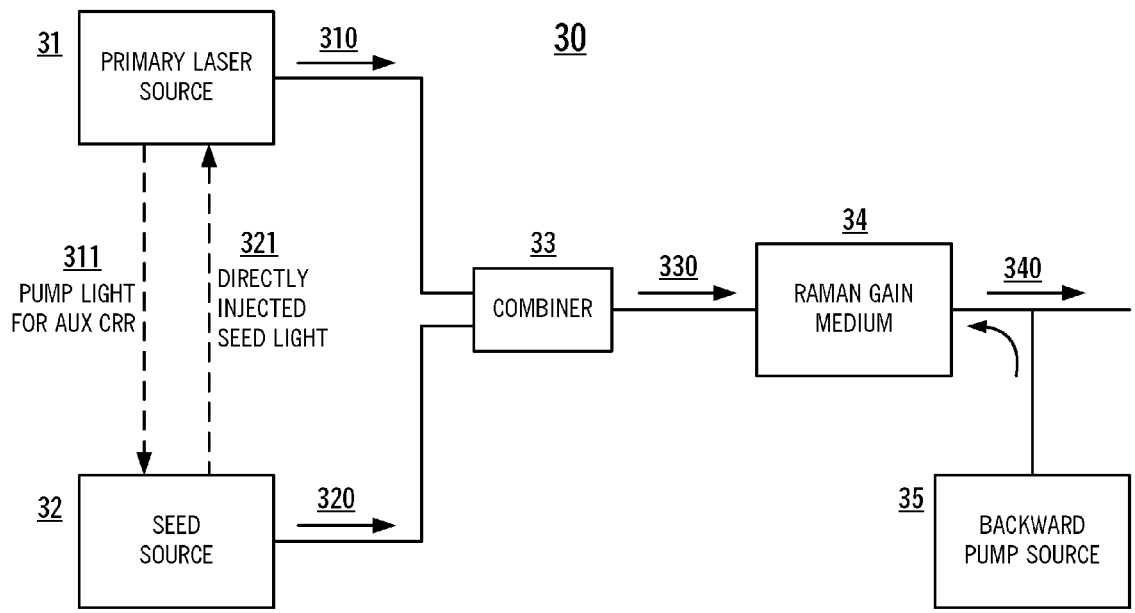
FIG. 3 shows a diagram of an architecture for a cascaded Raman amplifier according to an aspect of the present invention.
Figure 4:
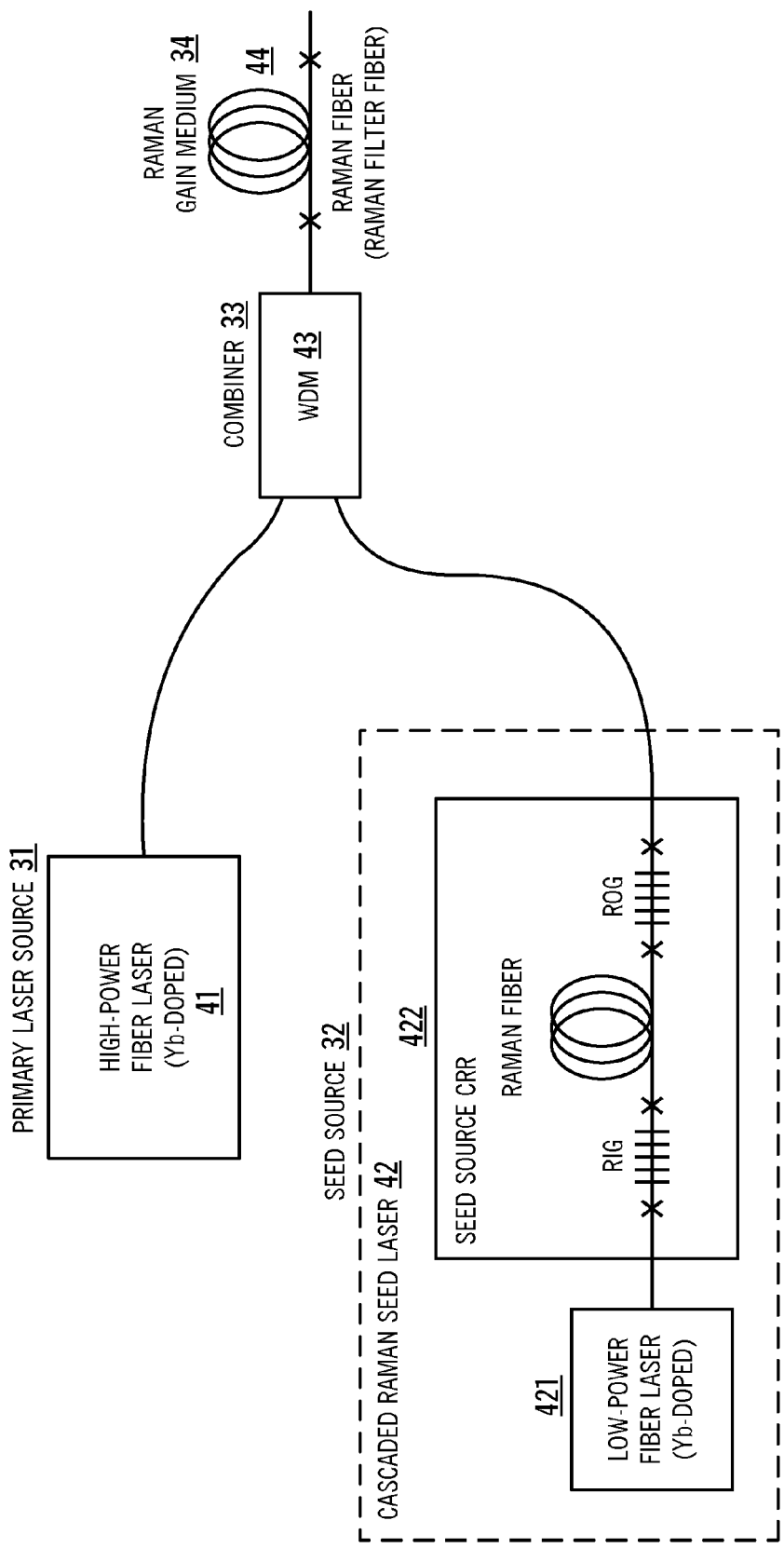
FIG. 4 shows a diagram of a cascaded Raman amplifier employing the FIG. 3 architecture.

FIG. 3 shows a general diagram of an exemplary Raman lasing system architecture 30 according to an aspect of the invention, and FIG. 4 shows a diagram of an exemplary system 40 employing architecture 30.

Architecture 30 comprises a primary laser source 31; a seed source 32, a combiner 33; and a Raman gain medium 34. The emitted primary laser light 310 is combined with the multi-wavelength seed light 320 at combiner 33. The combined light 330 is then fed into Raman gain medium 34, wherein it undergoes cascaded Raman lasing, resulting in a system output 340 at a selected target wavelength. If desired, a tuning feature (not shown) can be provided, for adjusting the wavelength of the system output 340.

Figure 3A:
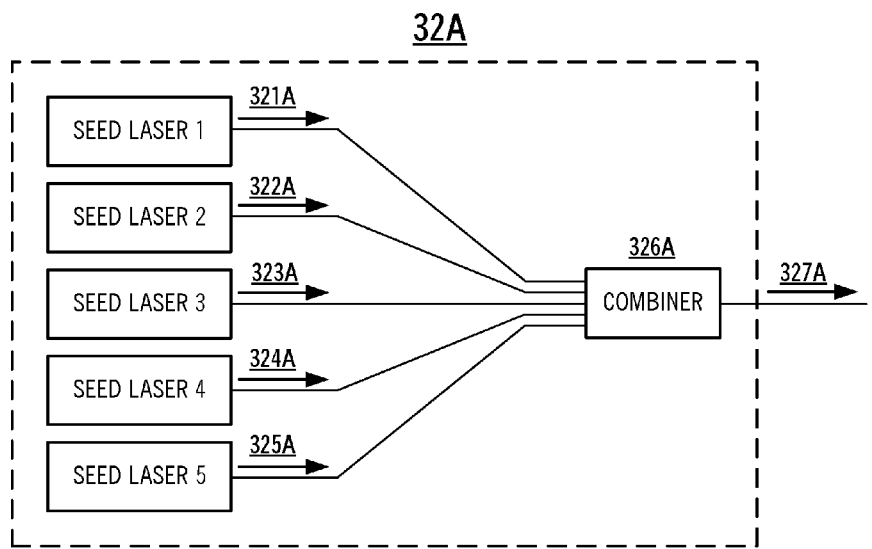
Figure 3B:
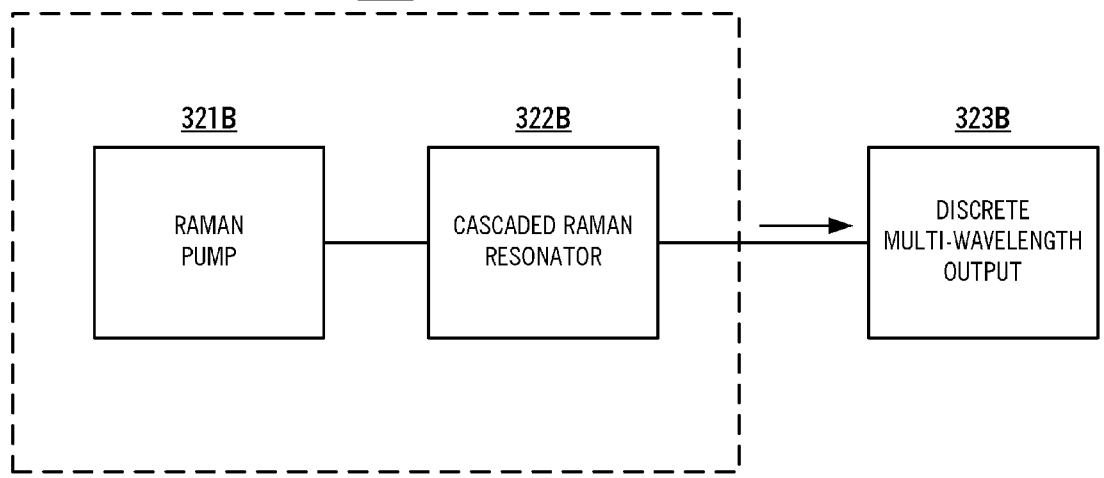
Figure 3C:
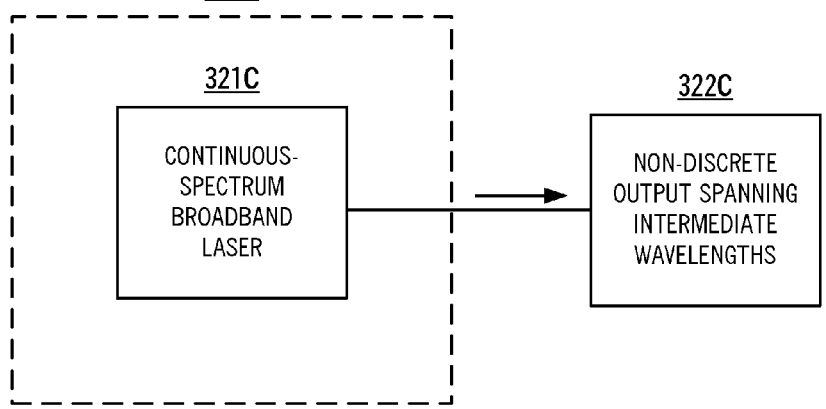

FIG. 3A shows a diagram of an exemplary implementation of seed source 32. An array of single-wavelength seed lasers 1-5 generates a respect set of seed light components 321-325 that are fed into a seed light combiner 326. The multi-wavelength combined light 327 is then used to seed the primary light. Seed light combiner 326 may be implemented using a WDM, a fiber coupler, or other suitable device.

Architecture 30 can be scaled upward or downward, as desired, to achieve a desired power level for the system output 340. At the low end, it is anticipated that a system employing architecture 30 will typically have an output of at least 5 W. At the high end, a system employing architecture 30 can be configured to have an output greater than 100 W. As discussed below, power scaling at the high end may make use of a plurality of amplification stages.

In exemplary system 40 (FIG. 4) the primary laser source 31 is provided by a high-power Yb-laser 41, the seed source 32 is provided by an auxiliary cascaded Raman laser 42, combiner 33 is provided by a wavelength-division multiplexer 43, and the Raman gain medium 34 is provided by a Raman fiber (or Raman filter fiber) 44.

The operating principle behind systems employing the new architecture 30 can be understood by conceptualizing architecture 30 as providing Raman amplifiers that simultaneously operate in a plurality of conversion stages, each conversion stage corresponding to a respective Stokes shift.

Thus, in Raman gain medium 34, the first (i.e., shortest) seed wavelength provided by the seed source 32 first gets amplified through stimulated Raman scattering using the primary laser input 310 as a pump source. The amplified light at the first seed wavelength (i.e., the amplified light at the first Stokes order) then acts as the pump source for the next seed wavelength (i.e., the next Stokes order). This cascaded process continues until the final Stokes order, i.e., the target output wavelength, acquires most of the power.

In this scheme the multi-wavelength seed source 32 is of utmost importance, ensuring that the gain process at all intermediate wavelengths is stimulated Raman scattering and not spontaneous Raman scattering. In the latter case, owing to the broadband nature of Raman gain in silica fibers, together with high thresholds necessary to grow a Stokes wavelength from noise, conversion over several wavelength shifts is unfeasible, or highly impractical at high power levels.

In cases with a small number of shifts, operating without a multi-wavelength seed source might be a possibility at relatively high power levels. However, the lack of wavelength selectivity in the broad Raman gain can make the successive wavelength shifts very broad and reduce their applicability. Furthermore, in this case much longer fiber lengths are necessary, which increases linear loss and reduces efficiency.

The use of a seed source mediates the conversion process by providing a path for the input wavelength to convert to the output wavelength using stimulated Raman scattering. This places some important requirements on the seed source. It needs to seed not just the output wavelength but also one or more intermediate Stokes wavelengths. This requirement is naturally met by a seed source made of a conventional cascaded Raman laser.

Once the target wavelength is reached, further conversion of the output wavelength to a post-target Stokes order is initially suppressed by the absence of a seed component at that Stokes order. The absence of a seed component creates a much higher power level requirement for further conversion. It is possible, in some situations, for the requisite power level to be reached. In that case, a Raman filter fiber with enhanced distributed loss at post-target wavelengths can be used to suppress post-target wavelength conversion.

It is noted that any or all of the individual components depicted in FIG. 3 may be implemented using a plurality of subcomponents or stages, or may be combined with each other or integrated into a larger whole. Further, a plurality of systems according to the invention may be combined with each other. Alternatively, one or more systems according to the invention may be configured as one or more subsystems of a more complex system.

The individual components depicted in FIGS. 3 and 4 are now described in greater detail.

2.1 Primary Laser Source

The function of primary laser source 31/41 is to provide a primary laser light at a selected wavelength (e.g., 1117 nm in system 40). In system 40, primary laser source 31 is implemented using a high-power (>200 W) cladding-pumped Yb-laser 41. Other implementations may be used for primary laser source 31. For example, in FIG. 5, discussed below, there is depicted an exemplary system 50, in which the primary laser source 31 is implemented using a laser incorporated a master-oscillator, power-amplifier architecture.

It is noted that the invention may be practiced with a primary light source providing an output at a lower power level, so long as the power level is sufficiently high to ensure that all of the requisite intensity thresholds are met, or exceeded, throughout the conversion process.

2.2 Seed Source

The function of the seed source 32/42 is to provide laser light having a plurality of wavelength components that are delivered at respective intensities that are sufficient, such that when the seed laser light is combined with the primary laser light and fed into the Raman gain medium, there results stimulated Raman scattering at each conversion stage, with little or no spontaneous Raman scattering.

In an exemplary practice of the invention, there is a one-to-one correspondence between the set of seed wavelengths and the set of conversion Stokes orders (i.e., the final Stokes order and all of the intermediate Stokes orders), and each seed wavelength is equal, within a respective tolerance range, to a respective Stokes order. As discussed below, it may also be possible to achieve acceptable results using a set of seed wavelengths in which one or more of the conversion Stokes orders is omitted. In that case, each non-seeded Stokes order would be generated by spontaneous Raman scattering.

If desired, the seed source can be configured to include a tuning feature, wherein the one or more of the seed components has a wavelength that is tunable in order to increase conversion efficiency. Further, as discussed below, the relative weights of the seed wavelengths can be adjusted to increase conversion efficiency, particularly at low input powers. If desired, the seed source can be configured to include a weight adjustment feature, wherein the relative weights of at least some of the seed wavelengths can be adjusted at an installation site.

In system 40 (FIG. 4), the seed source 32 is implemented using a cascaded Raman seed laser 42 comprising a low-power Yb-doped fiber laser 421, and a seed source CRR 422. As discussed above with respect to FIG. 3A, it is also be possible to implement the seed source 32 using a plurality of single-wavelength lasers. It would also be possible to implement seed source 32 using other types of multi-wavelength lasers, or some combination of single-wavelength and multi-wavelength lasers. Generally speaking, it is desirable for all of the Stokes orders to be seeded simultaneously. In certain applications, the use of a plurality of seed lasers at selected Stokes orders may contribute towards simultaneous seeding.

Generally speaking, seed Raman laser 42, or other seed source 32, can be implemented using a low-power laser (i.e., <10 W) or combination of low-power lasers. For example, in system 50 (FIG. 5) discussed below, a cascaded Raman laser having a ~3 W output at the 1480 nm target wavelength and a total output power of <4 W is used to seed a primary laser light emitted by a laser having an output power of ~225 W. Because the power requirements for the seed source 32 are relatively low, it is possible to implement seed source 32 using a relatively inefficient conventional Raman laser, while still achieving a significant increase in overall conversion efficiency.

As indicated by dashed arrow 311 in FIG. 3, it would be possible in certain configurations for a portion of the light emitted by primary laser source 31 to be diverted for use as pump light for seed source 32. Thus, in system 40 (FIG. 4), the diverted primary laser light would take the place of auxiliary Raman laser pump 421.

It further noted that, system 40 can by modified in a number of ways by making suitable modifications to the Raman seed laser 42. Such modifications can include, for example, one or more of the following:

An efficient, high-power, narrow line-width output can be achieved by coupling a narrow line-width seed with a CRR and launching together into a high power Raman amplifier. As discussed below, stimulated Brillouin scattering can be suppressed in such a system by suitable phase/amplitude modulation of the narrow line-width seed.

Pulse amplification can be achieved by using a pulsed seed source.

It is further noted that seed source 32 can be implemented using a Raman seed laser having a cascaded Raman resonator that is implemented using a ring laser, wherein WDMs provide multi-wavelength feedback.

2.3 Combiner

Combiner 33 is an optical device that is configured to combine light received, respectively, from the primary input laser 31 and the seed source 32, and then provide the combined light as an input into Raman gain medium 34.

In system 40 (FIG. 4), combiner 33 is implemented using a wavelength division multiplexer 43. Alternatively, the input combiner can be implemented using a fiber coupler, or other suitable optical device.

Further, as indicated by dashed arrow 321 in FIG. 3, some or all of the seed wavelengths can be fed directly into the primary laser source 31. In system 40 (FIG. 4), that would mean providing an optical connection to allow some or all of the light emitted by the seed Raman laser to be fed directly into the cavity of Yb-laser 411, thereby reducing loss introduced by WDM 43.

If all of the seed light is fed directly into primary laser source 31, there is no longer any need for combiner 33, which would therefore be omitted. In that case, the combined light emission of primary laser source 31 would be fed directly into Raman gain medium 34.

2.4 Raman Gain Medium

Generally speaking, Raman gain medium 34 can be implemented using any suitable medium that supports cascaded Raman lasing. In addition, although illustrated as a unitary component in FIG. 3, the Raman gain medium 34 may comprise a plurality of elements. Thus, for example, Raman gain medium 34 may comprise two or more fibers that are connected to each other. Also, Raman gain medium 34 may be implemented using a cascaded Raman resonator, or other structure supporting cascaded Raman lasing.

In the practices of the invention described below, Raman gain medium 34 is implemented using a Raman fiber or a Raman filter fiber. As mentioned above, the preferred fiber type for a given application depends upon the system power levels. At lower powers, Raman gain medium 34 may suitably be provided by a conventional Raman fiber. At higher powers, it is possible for the target wavelength light to reach an intensity that results in stimulated Raman scattering at wavelengths longer than the target wavelength. Such post-target SRS causes a depletion of light at the target wavelength, thus reducing conversion efficiency. By employing a Raman filter fiber with a suitable cutoff wavelength, it is possible to frustrate stimulated Raman scattering beyond the target wavelength.

Depending upon the particular application, it may be desirable to implement the Raman gain source 34 using a Raman fiber having a relatively large mode area, thereby possibly decreasing net system loss.

In addition, depending upon a given application, it may be desirable to implement the Raman gain medium using an optical fiber that, in addition to being suitable for Raman lasing, also has one or more further desired properties. For example, a polarized system output may be desired. In that case, the Raman gain medium may comprise a polarization-maintaining Raman fiber or polarization-maintaining Raman filter fiber. Further, if stimulated Brillouin scattering (SBS) is an issue, the Raman gain medium may comprise an SBS-suppressing Raman fiber or an SBS-suppressing Raman filter fiber.

It is noted that other implementations and techniques can be used to suppress SBS. For example, seed source 32 can be implemented using a Raman laser in which the CRR is pumped by a narrow line-width pump laser, and in which the system is configured to provide as an output a narrow line-width laser light at the target wavelength. In that case, SBS can be suppressed by suitable phase/amplitude modulation of the narrow line-width seed light emitted by the seed source.

It is further noted that the Raman gain medium 34 may be configured to include other optical devices, such as gratings, or the like. Thus, for example, it would be possible for Raman gain medium 34 to be implemented using a cascaded Raman resonator, of the type illustrated in FIG. 1B, discussed above.

3. Experimental Confirmation

An exemplary system constructed according to aspects of the invention described herein demonstrated enhanced efficiency, generating a record 150 W of output power at 1480 nm utilizing a total input power of approximately 230 W at 1117 nm, corresponding to a conversion efficiency of approximately 65%.

3.1 Experimental Setup

Figure 5:
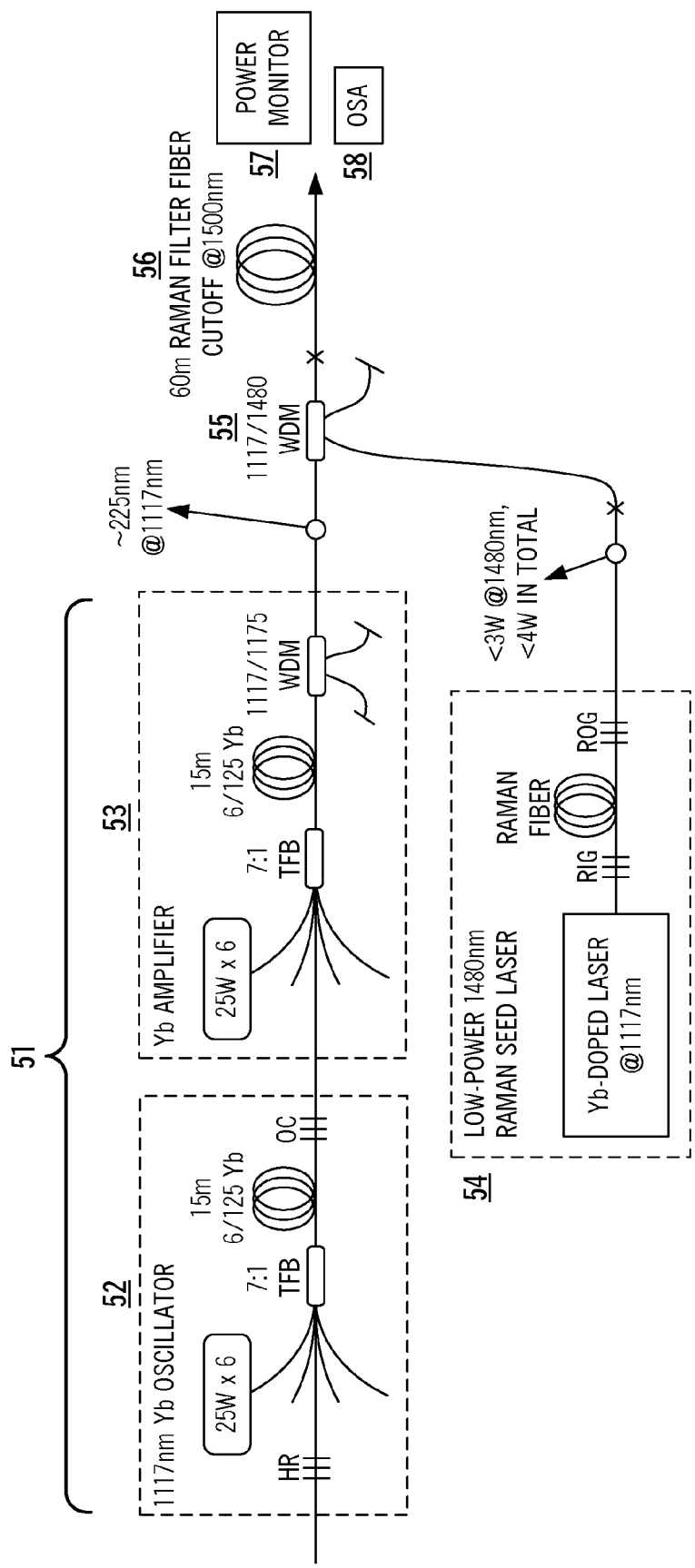
FIG. 5 shows a diagram of an exemplary cascaded Raman amplifier according to a further aspect of the invention, in which the primary laser source is implemented by a laser having a master oscillator, power amplifier (MOPA) configuration.

FIG. 5 shows a diagram of the exemplary Raman system 50 used to demonstrate increased conversion efficiency. Raman system 50 comprises a primary laser source 51, a seed source 54, a combiner 55, and a Raman gain medium 56. The output of system was analyzed using a power monitor 57, and an optical spectrum analyzer 58.

The individual components of Raman system 50 are now described in greater detail.

Primary Laser Source

In system 50, the primary laser source 31 comprises a high-power 1117 nm laser 51 having a master oscillator, power amplifier (MOPA) architecture, comprising oscillator stage 52 and amplifier stage 53

The MOPA oscillator stage 52 comprises a cladding-pumped Yb-doped fiber laser pumped by 6 nominally 25 W laser diodes at 975 nm. A 7-to-1 pump tapered fiber bundle (TFB) combiner is used to combine the pump inputs. The gain fiber is 15 m of a Yb-doped fiber having a core diameter of 6 µm, and an outer cladding diameter of 125 µm.

The MOPA amplifier stage 53 comprises six 25 W pump diodes at 975 nm, and 15 m of Yb-doped fiber. At the output end of the amplifier fiber, there is connected a 1117/1175 nm wavelength-division multiplexer, which is used to prevent possible instabilities in the source, resulting from backward propagating power at the first Stokes shift wavelength of 1175 nm, which also has some gain in the Yb-doped fiber.

At maximum pump power, the MOPA architecture delivers approximately 225 W of power at a wavelength of 1117 nm. The conversion efficiency between the 975 nm pump power input to the 1117 nm output was approximately 68%. It is believed that optimization techniques known in the art can be used to increase the conversion efficiency by a few percentage points.

Seed Source

In system 50, the seed source is implemented using a low-power 1480 nm Raman laser 54, which comprises a Yb-doped fiber oscillator, and a cascaded Raman resonator stage of the type shown in FIG. 1B, discussed above. The target wavelength of the auxiliary Raman laser is 1480 nm, which is provided as an output having a power <3 W. The total power output (i.e., the power output at all Stokes orders, including 1480 nm) is <4 W.

The conversion efficiency of the auxiliary Raman laser can be optimized to close to 50%. As discussed below, at higher power levels, the power levels of the Raman seed laser represent a comparatively small percentage of the input power relative to the output power. Thus, at these higher power levels output, the effect of the Raman seed laser efficiency on the overall efficiency is acceptably small.

Combiner

In system 50, the combiner 33 comprises a 1117 nm/1480 nm wavelength-division multiplexer (WDM) 55.

Principal Raman Gain Medium

In system 50, the Raman gain medium 34 comprises a 60 m length of Raman filter fiber 56 with a mode field area of ~15 µm² and a long wavelength cutoff at around 1500 nm. The reason for the use of a Raman filter fiber (i.e., instead of a conventional Raman fiber) is in order to suppress possible conversion to the next Stokes wavelength at 1590 nm, which was an issue because of the record-high power levels.

3.2 Results

There are now described a number of experiments that were performed on the new system, demonstrating a significant enhancement in efficiency compared with an exemplary conventional system.

Raman Seed Laser Output Spectrum

Figure 6:
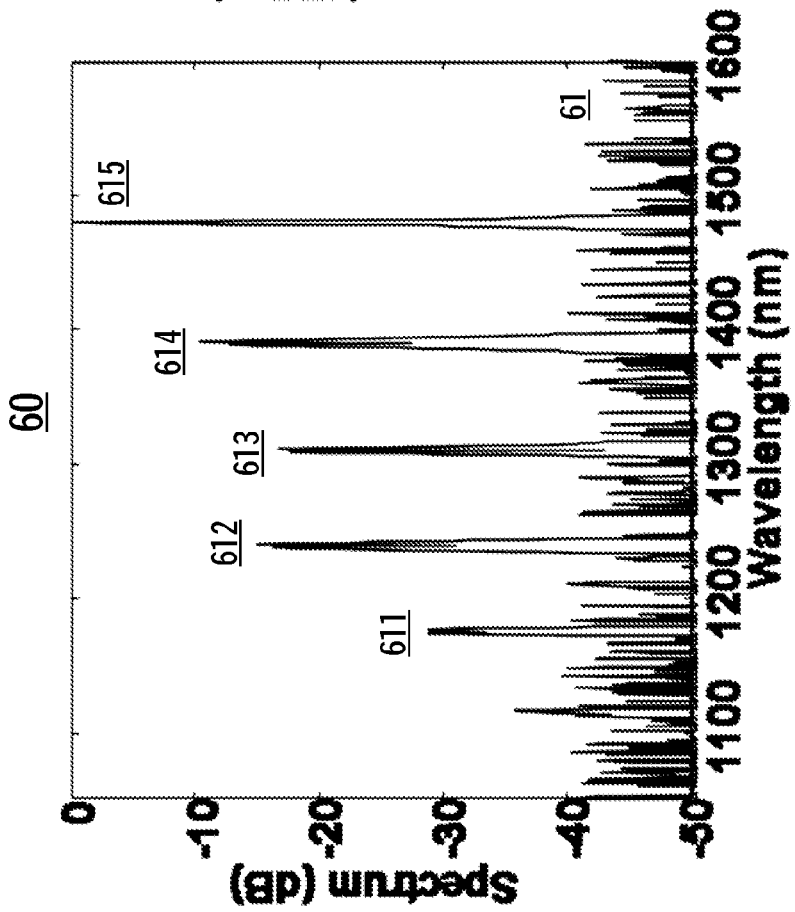
FIG. 6 shows a graph illustrating the output spectrum resulting from tests performed on the FIG. 5 Raman amplifier.

In one experiment, only the Raman seed input was turned on. FIG. 6 shows a graph 60 that illustrates the resulting output spectrum 61. Spectrum 61 clearly shows the power contributions at each of the Stokes orders 611-615 that are necessary for cascaded Raman amplification. The already weak 1117 nm component 611 is further suppressed by the WDM 55 used to combine the primary and seed inputs into the Raman gain medium 56. The weakness of the 1117 nm component is beneficial, as it tends to prevent any issues arising with respect to coherent interference at the input wavelength when the seed input is combined with the primary laser input.

Figure 7:
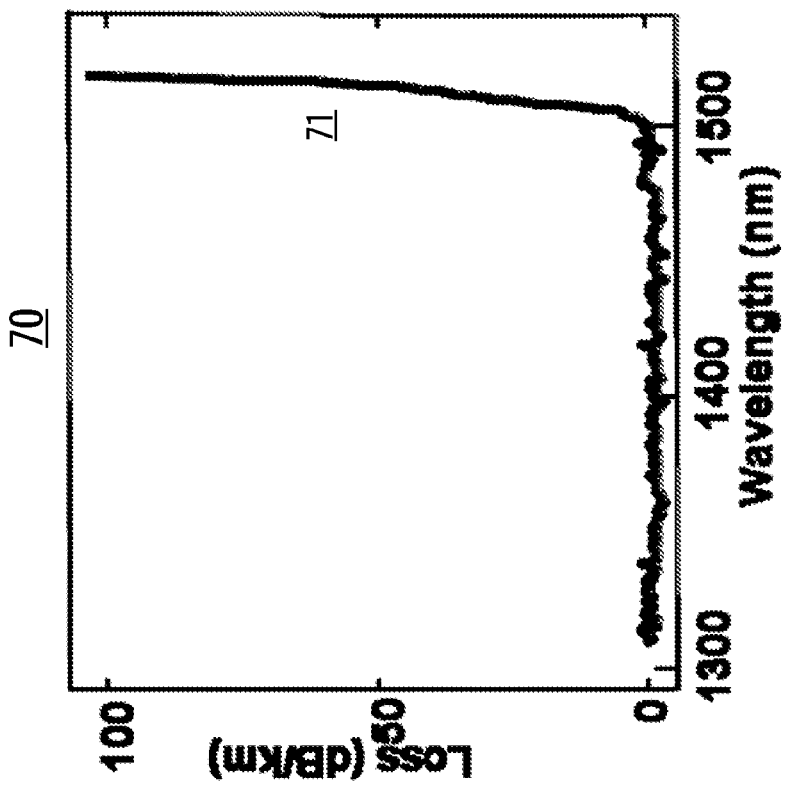
FIG. 7 shows a graph illustrative the loss curve for the Raman filter fiber used in the FIG. 5 Raman amplifier.

FIG. 7 shows a graph illustrating the loss curve 70 for the Raman filter fiber used clearly showing the long wavelength cut-off at approximately 1500 nm.

Target Wavelength Component of Total System Output

As discussed above, the output of a Raman laser typically comprises a number of wavelength components, including light at the target wavelength, as well as light at each of the Stokes wavelengths. Generally speaking, it is desirable for the target wavelength component to be as large as possible compared with the intermediate Stokes wavelength components.

Thus, an experiment was conducted in order to determine the relative size of the target wavelength component of the output of system 50. In the experiment, the power contribution of the target wavelength component (i.e., the 1480 nm component) was measured using a dielectric band-edge filter that removed all of the intermediate Stokes wavelengths.

Figure 8:
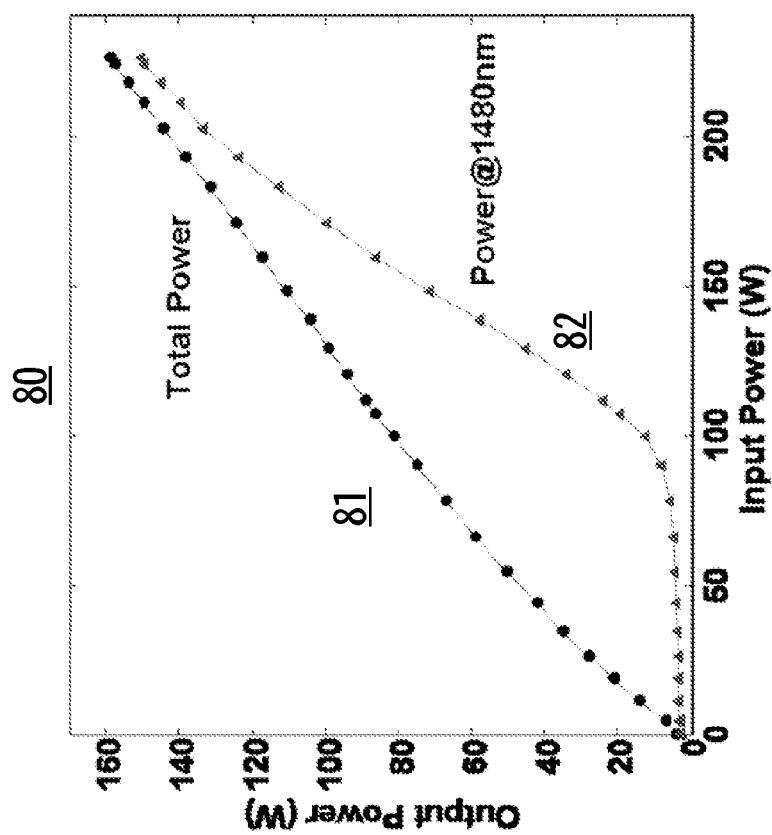
FIG. 8 shows a graph illustrating the results of tests conducted to determine the relative size of the target wavelength component of the FIG. 5 Raman amplifier.

FIG. 8 shows a graph 80 illustrating the results. The upper plot 81 shows the total output power (i.e., the combined output power at all wavelengths). The lower plot 82 shows the power contribution of the 1480 nm component of the total output.

It can be seen that, initially, the power component at 1480 nm does not enhance with increasing input power. This is because at these power levels, the net Raman gain is not high enough to drive conversion all the way to 1480 nm. As the power level increases, there is a rapid enhancement of the 1480 nm component. At maximum input power of ~230 W (including the input power for the seed source), the total output power is ~158 W and the 1480 nm component is ~150 W. This power level is the highest power output demonstrated to date from a cascaded Raman fiber laser at 1480 nm. The 1480 nm component corresponds to a fraction of ~95% of the total output power indicating a high degree of wavelength conversion. The net conversion efficiency from 1117 nm to 1480 nm is ~65%.

Figure 9:
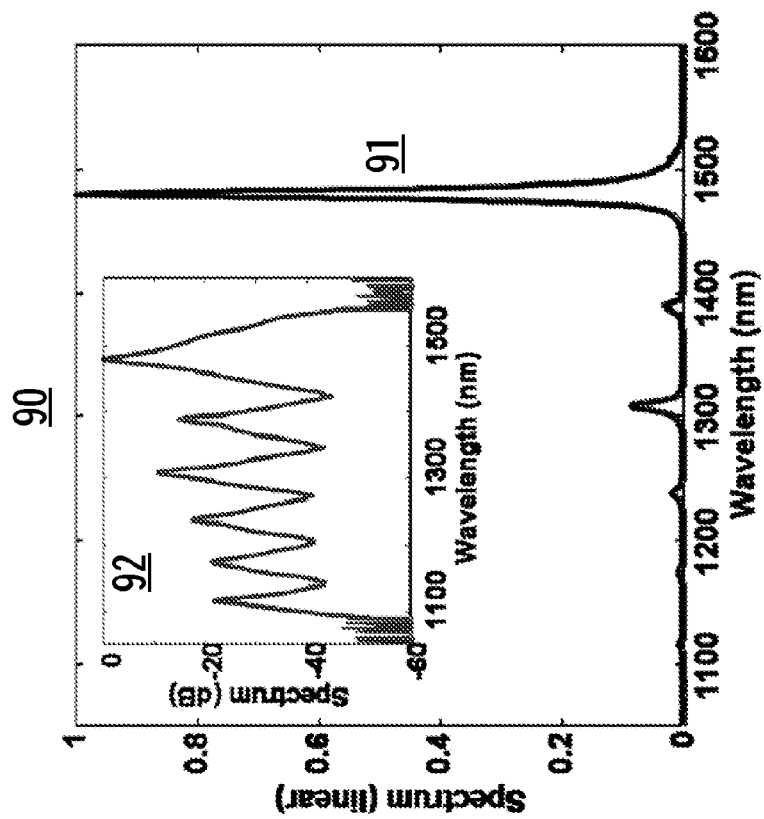
FIG. 9 shows a graph illustrating the FIG. 5 output spectrum in linear scale and log scale (insert).

FIG. 9 shows a graph 90 illustrating the output spectrum in linear scale 91. Inset 92 illustrates the output spectrum in log scale 92. It is clear from FIG. 9 that most of the power is in the 1480 nm band. Furthermore, the absence of Stokes orders at higher wavelengths indicates the high-quality suppression supported by the Raman filter fiber.

The input power level at which the 1480 nm component starts rising can be easily lowered by choosing longer fiber lengths. This makes this technique applicable equally well at lower power levels. Since longer lengths can introduce a small additional loss due to propagation loss in fiber, in this demonstration the fiber length was chosen to maximize the conversion efficiency at maximum input power.

Figure 10:
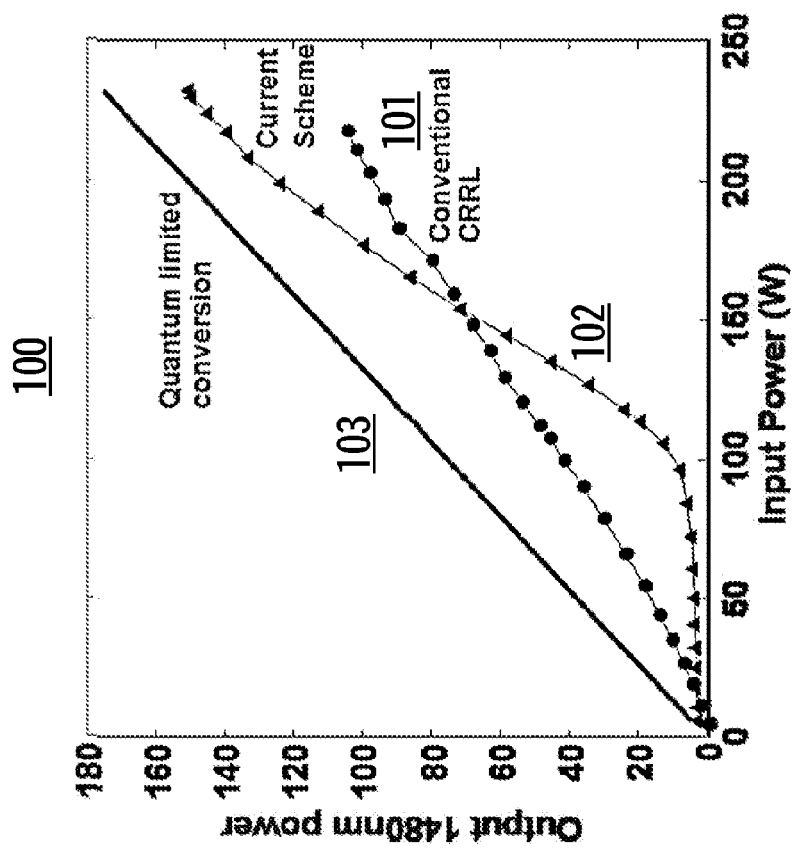

Another possibility for adjusting the output power vs. input power curve shown in FIG. 10 is by altering the relative strengths of the intermediate Stokes orders in seen in FIG. 6. It can be observed that the input power at 1175 into the Raman amplifier stage is very weak, which could potentially account for the high input power required to observe 1480 nm gain in FIG. 8. The relative weighting of intermediate Stokes orders is an additional degree of freedom to be explored.

Comparison of Conversion Efficiency of New and Conventional Systems

Figure 11:
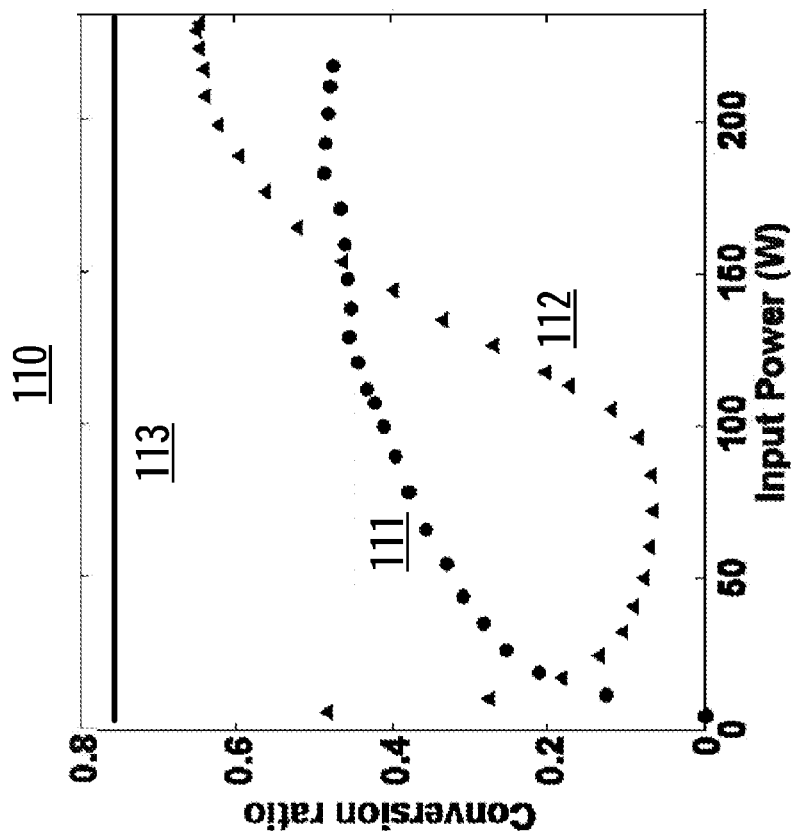
FIGS. 10 and 11 show a pair of graphs comparing the efficiency of an exemplary 1175 nm-to-1480 nm system according to the present invention, and an earlier conventional scheme.

FIGS. 10 and 11 are a pair of graphs 100, 110 comparing the efficiency of an exemplary 1175 nm-to-1480 nm system embodying aspects of the present invention, and an earlier conventional scheme that generated a record output (at that time) of >100 W at 1480 nm.

In graph 100 (FIG. 10), output power is plotted with respect to input power for the two systems. Plot 101 shows the output power for the conventional system, and plot 102 shows the output power for the new system. Line 103 represents the quantum limited conversion efficiency (~75%), which illustrates the theoretical maximum achievable efficiency, and is provided for reference and comparison.

In graph 110 (FIG. 11), which is based on the same data as graph 100 (FIG. 10), the conversion efficiency (i.e., the conversion ratio, output power÷input power) is graphed as a function of input power for the two systems. Plot 111 shows the conversion ratio for the conventional system, plot 112 shows the conversion ratio for the new system, and line 113 shows the theoretical maximum achievable conversation ratio.

As shown in FIG. 5B, the maximum efficiency achieved by the conventional system is ~48%. For the new architecture, as the input power increases, the efficiency initially decreases and then rises quickly and saturates at ~65%. The quantum limited conversion efficiency is ~75%.

It can be clearly seen that, at high power output levels, the new architecture is significantly more efficient than the conventional system. Near the maximum input power levels, it can be seen that the new architecture provides almost 40% more power for the same input power, and thus represents a significant enhancement.

It is noted that, in the exemplary the new system, the seed source comprises a conventional cascaded Raman laser, which displays a conversion efficiency similar to the conversion efficiency illustrated by plot 111 in FIG. 11. At lower power levels, the Raman laser seed source represents a higher percentage of the power input, relative to the power output. The inefficiency of the Raman laser seed source accounts for the relatively low conversion efficiency of the new system at these lower output levels.

A number of sources of loss have been identified that provide guidance as to possible ways to further enhance conversion efficiency, and to come even closer to the quantum limit. The identified sources of loss include the following:

(a) The WDM used to combine the primary laser input and the seed input has a measured loss of approximately 4%.

(b) The splice between the WDM output fiber and the Raman fiber has a measured loss of approximately 3%.

(c) The remaining loss is due to power remaining in the other Stokes orders (approximately 4%, measured), and fiber attenuation in fiber (less than 3%, calculated remaining component).

4. Further Practices of the Invention

It will be appreciated that the above-described exemplary systems can be modified to incorporate additional elements, some of which have been mentioned above. In addition, aspects of the invention can be incorporated into other types of system configurations, or combinations of system configurations.

For example, as illustrated by box 35 in FIG. 3, architecture 30 can include a backward pumping feature, whereby pump energy can be launched into the Raman gain medium 34 at both an input end and at an output end (i.e., in both a forward and a rearward direction). The backward pumping can be implemented, for example, by suitably connecting to the output end of Raman gain medium 34 a laser light source of the type used to implement primary laser source 31. Other backward pumping schemes may also be used.

Figure 12:
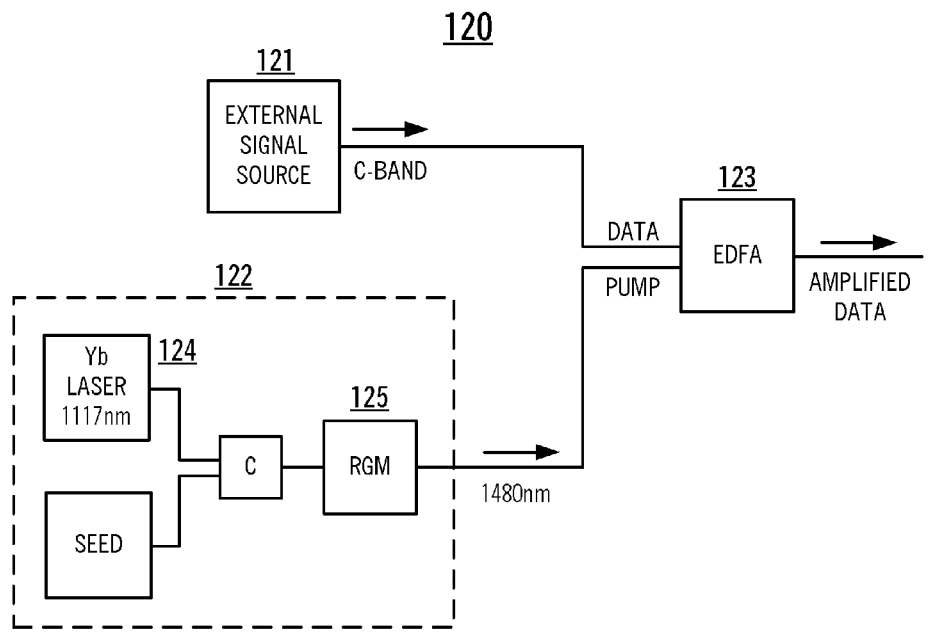
FIG. 12 is a diagram of an exemplary configuration according to a further aspect of the invention, in which a laser operating in the Yb-doped fiber band is used to amplify a C-band transmission from an external signal source.

FIG. 12 is a diagram of an exemplary configuration 120 according to a further aspect of the invention, in which a laser operating in the Yb-doped fiber band is used to amplify a C-band transmission from an external signal source 121. In addition to external signal source 121, configuration 120 includes a Raman amplifier 122 according to the present invention, and an erbium-doped fiber amplifier (EDFA) 123.

In Raman amplifier 122, the primary laser source is implemented using a Yb-doped fiber laser 124 that emits laser light at 1117 nm. As described above, Raman amplifier 122 converts the 1117 nm primary laser light into an output having a selected target wavelength, i.e., 1480 nm. The conversion mediated by seeding of the primary laser light at a plurality of Stokes orders prior to cascaded Raman amplification within the Raman gain medium 125.

Figure 13:
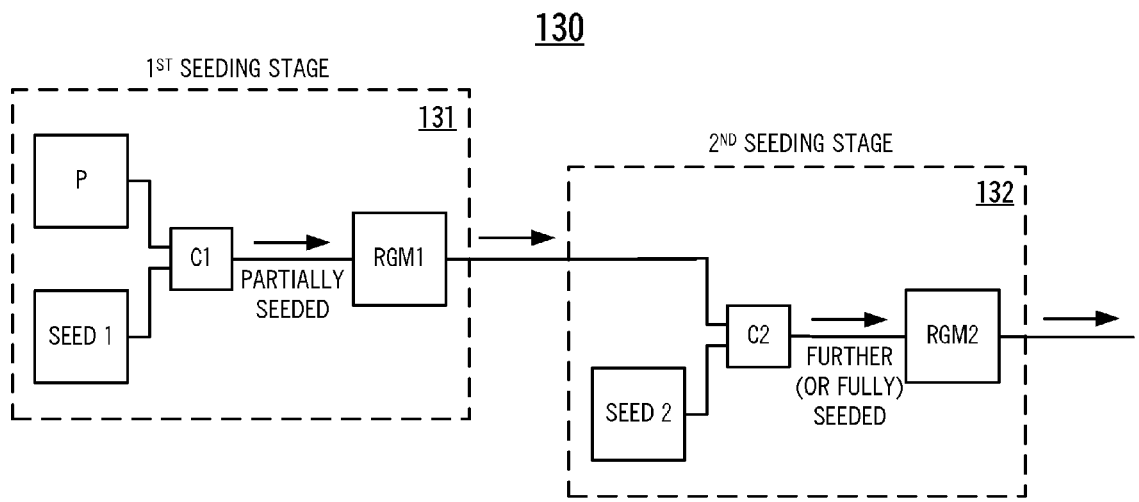
FIG. 13 shows a diagram of a hybrid architecture according to a further aspect of the invention, in which a conversion from an initial wavelength to a target wavelength is performed in a plurality of seeding stages.

FIG. 13 shows a diagram of a hybrid architecture 130 according to a further aspect of the invention, in which a conversion from an initial wavelength to a target wavelength is performed in a plurality of seeding stages. Architecture 130 employs two seeding stages 131 and 132, but more stages can be incorporated, if desired.

In the first seeding stage 131, some but not all of the conversion Stokes orders are seeded in the first seeding stage 131. The partially seeded light is fed into a first-stage Raman gain medium RGM1, for a first round of cascaded Raman amplification. The first seeding stage output 133 is then provided as an input into the second seeding stage 132, where it is further seeded at additional wavelengths.

The second seeding stage 132 can be configured to supply all of the seed wavelengths omitted from the first seeding stage 131, or a selected subset thereof. The additionally seeded light is fed into a second-stage Raman gain medium RGM2 for a second round of cascaded Raman amplification. The seeding process may terminate in the second seeding stage 132, or may be continued in one or more additional seeding stages.

Figure 14:
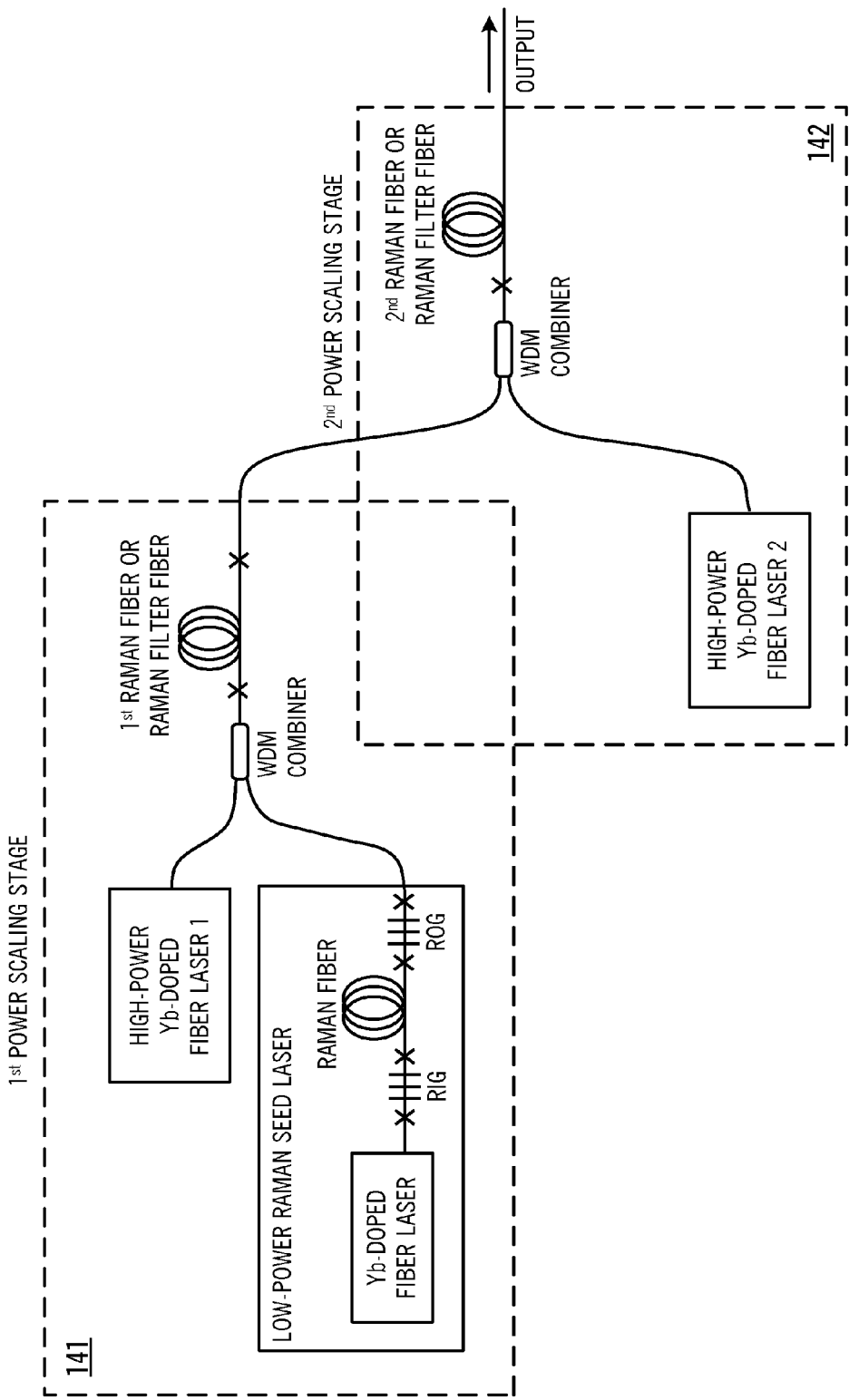
FIG. 14 shows a diagram of an architecture according to a further aspect of the invention, in which further power scaling of the output power is provided over a plurality of stages.

FIG. 14 shows a diagram of an architecture 140, in which further power scaling of the output power is provided over a plurality of stages. A first power scaling stage 141 provides Raman amplification for the output of a first high-power Yb-doped fiber laser. The output of the first power scaling stage 141 is combined with the output of a second high-power Yb-doped fiber laser, and the combined light is then fed into a second Raman fiber or Raman filter fiber. Additional power scaling stages may be added, as desired.

5. General Technique

Figure 15:
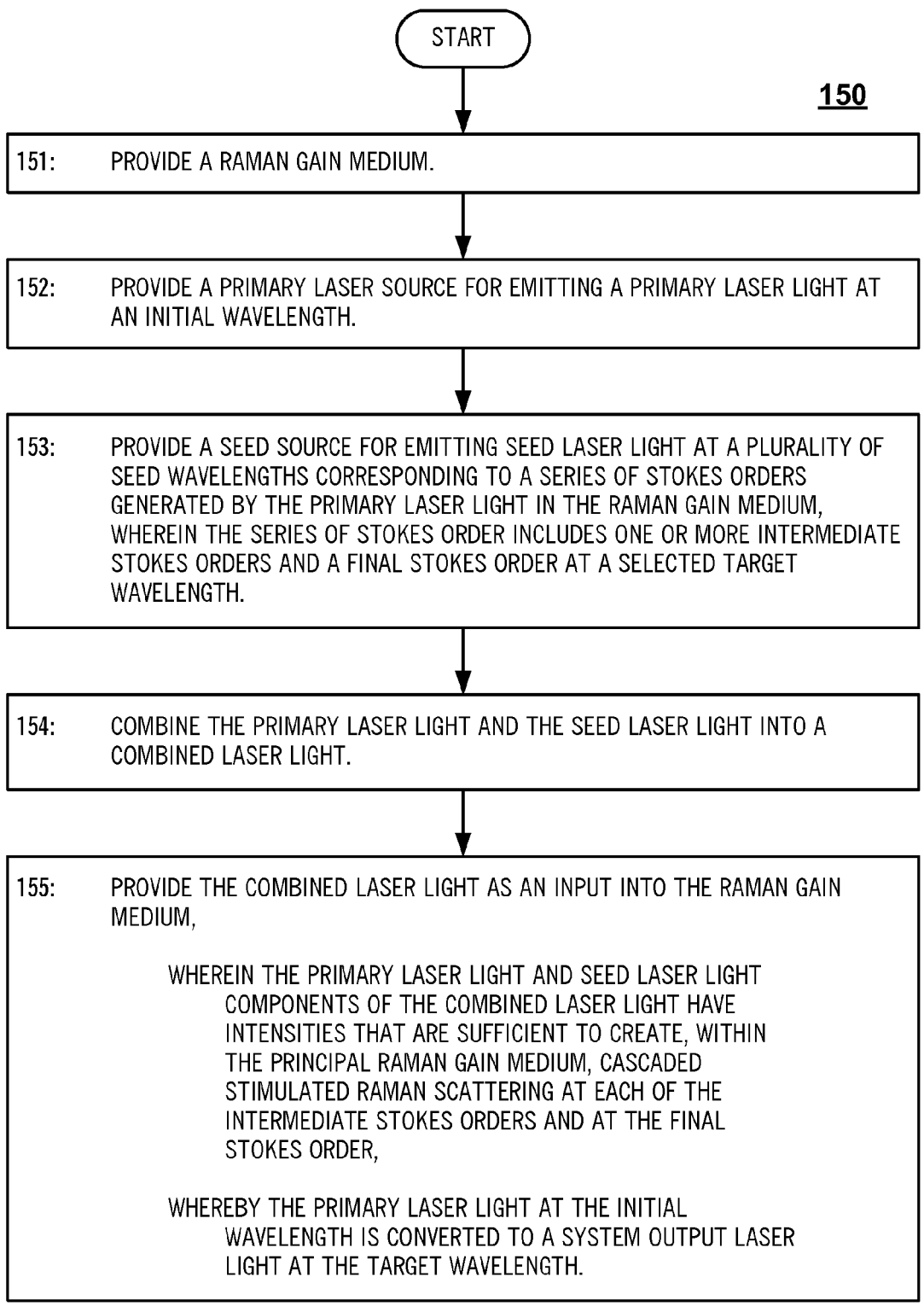
FIG. 15 shows a flowchart illustrating a general Raman amplification technique according to a further aspect of the invention.

FIG. 15 shows a flowchart of a general technique 150 according to a further aspect of the invention for achieving high conversion efficiency in a Raman system.

It is noted that FIG. 15 is intended to be exemplary, rather than limiting. The present invention may be practiced in a number of different ways, using different combinations of some or all of the elements set forth in these drawings, as well as combinations including elements not explicitly set forth in these drawings. Further, the enumerated steps may be performed in a different order, or contemporaneously.

General technique 150 comprises the following steps:

151: Provide a Raman gain medium.

152: Provide a primary laser source for emitting a primary laser light at an initial wavelength.

153: Provide a seed source for emitting seed laser light at a plurality of seed wavelengths corresponding to a series of Stokes orders generated by the primary laser light in the Raman gain medium, wherein the series of Stokes order includes one or more intermediate Stokes orders and a final Stokes order at a selected target wavelength.

154: Combine the primary laser light and the seed laser light into a combined laser light.

155: Provide the combined laser light as an input into the Raman gain medium, wherein the primary laser light and seed laser light components of the combined laser light have intensities that are sufficient to create, within the principal Raman gain medium, cascaded stimulated Raman scattering at each of the intermediate Stokes orders and at the final Stokes order, whereby the primary laser light at the initial wavelength is converted to a system output laser light at the target wavelength.

Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A light generation and amplification system, comprising:
    a Raman gain medium;
    a primary laser source for emitting a primary laser light at an initial wavelength;
    a seed source for emitting a multi-wavelength seed laser light, comprising a plurality of seed wavelengths corresponding to a series of Stokes orders generated by the primary laser light in the Raman gain medium, wherein the series of Stokes order includes one or more intermediate Stokes orders and a final Stokes order at a selected target wavelength; and
    a seed light combiner for combining the primary laser light and the seed laser light into a combined laser light and providing the combined laser light as an input into the Raman gain medium,
    wherein the primary laser light and seed laser light components of the combined laser light have intensities that are sufficient to create, within the principal Raman gain medium, cascaded stimulated Raman scattering at each of the intermediate Stokes orders and at the final Stokes order,
    whereby the primary laser light at the initial wavelength is converted to a system output laser light at the target wavelength,
    wherein the seed source comprises a plurality of seed lasers providing different respective sets of seed wavelengths, so as to enable a multi-wavelength system output, and
    wherein the seed lasers are configured to provide individually selectable power outputs, so as to provide selectable power levels for individual wavelengths of the system output.

2. The system of claim 1, wherein the seed light combiner comprises a wavelength division multiplexer connected to the primary laser source, the seed source, and the Raman gain medium.

3. The system of claim 1, wherein the seed light combiner comprises a fiber coupler connected to the primary laser source, the seed source, and the Raman gain medium.

4. The system of claim 1,
    wherein the seed source comprises an auxiliary Raman laser, comprising a cascaded Raman resonator (CRR) for receiving a pump laser light as an input, and for generating a laser light output comprising a series of Stokes orders corresponding to the seed wavelengths.

5. The system of claim 4,
wherein the pump laser light input to the CRR comprises a portion of the primary laser light.

6. The system of claim 1,
wherein the principal Raman gain medium is a Raman fiber.

7. The system of claim 1,
wherein the low-power laser light seed source and the high-power fiber laser are polarized lasers, and the Raman gain fiber is polarization-maintaining Raman fiber, such that the system generates as an output a polarized laser light at the target wavelength.

8. The system of claim 1,
wherein the seed source is pulsed, so as to provide pulse amplification of the primary laser light.

9. The system of claim 1,
wherein the seed source comprises a Raman laser, comprising a narrow line-width pump laser and a cascaded Raman resonator (CRR), and wherein the system is configured to provide as an output a narrow line-width laser light at the target wavelength.

10. The system of claim 1, wherein the seed source comprises a plurality of laser sources, each providing one or more respective seed wavelengths.

11. The system of claim 1, wherein
the seed source is configured to provide a tuning function, whereby one or more seed wavelengths are tunable, and
wherein the system output wavelength is tunable by tuning one or more seed wavelengths.

12. The system of claim 1,
wherein the seed source is configured to provide a plurality of seed wavelengths that correspond to fewer than all of the intermediate and final Stokes orders of the primary laser source, thereby resulting in one or more seed wavelength gaps, and
wherein the one or more seed wavelength gaps are filled by spontaneous Raman scattering within the principal Raman gain medium.

13. The system of claim 1,
wherein one or more seed wavelengths are directly injected from the seed source into a laser cavity in the primary laser source, thereby reducing combiner losses.

* * * * *